United States Patent
Cheng et al.

(10) Patent No.: US 11,027,231 B2
(45) Date of Patent: Jun. 8, 2021

(54) AIR FILTER WITH VISUAL FILTER LIFE INDICATOR ZONE AND SORBENT-LOADED VISUAL REFERENCE ZONE

(71) Applicant: 3M INNOVATIVE PROPERTIES COMPANY, St. Paul, MN (US)

(72) Inventors: Liang Cheng, Shanghai (CN); Andrew R. Fox, Oakdale, MN (US); Himanshu Jasuja, St. Paul, MN (US); Zhiqun Zhang, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 224 days.

(21) Appl. No.: 16/348,254

(22) PCT Filed: Nov. 17, 2016

(86) PCT No.: PCT/CN2016/106223
§ 371 (c)(1),
(2) Date: May 8, 2019

(87) PCT Pub. No.: WO2018/090279
PCT Pub. Date: May 24, 2018

(65) Prior Publication Data
US 2019/0314751 A1    Oct. 17, 2019

(51) Int. Cl.
*B01D 46/00* (2006.01)
*B01D 53/00* (2006.01)
*B01D 46/10* (2006.01)
*B01D 29/13* (2006.01)
*B01D 46/52* (2006.01)
(Continued)

(52) U.S. Cl.
CPC ........ *B01D 46/0086* (2013.01); *B01D 29/13* (2013.01); *B01D 35/143* (2013.01); *B01D 46/0023* (2013.01); *B01D 46/0032* (2013.01); *B01D 46/0036* (2013.01); *B01D 46/10* (2013.01); *B01D 46/521* (2013.01); *B01D 53/04* (2013.01)

(58) Field of Classification Search
CPC .... B01D 35/143; B01D 29/13; B01D 46/521; B01D 46/0086; B01D 53/04; B01D 46/0023; B01D 46/0032; B01D 46/0036
See application file for complete search history.

(56) References Cited

U.S. PATENT DOCUMENTS

| | | |
|---|---|---|
| RE30,782 E | 10/1981 | van Turnhout |
| RE31,285 E | 6/1983 | van Turnhout |
| 4,455,187 A | 6/1984 | Von Blucher |

(Continued)

FOREIGN PATENT DOCUMENTS

| | | |
|---|---|---|
| CN | 102458583 | 5/2012 |
| CN | 104415624 | 3/2015 |

(Continued)

OTHER PUBLICATIONS

International Search report for PCT International Application No. PCT/CN2016/106223 dated Aug. 21, 2017, 5 pages.

*Primary Examiner* — Robert A Hopkins
(74) *Attorney, Agent, or Firm* — Kenneth B. Wood

(57) ABSTRACT

An air filter (1) comprises an air filter media (10) with a sorbent-free area (20) that provides a visual filter life indicator zone (30) and with a sorbent-loaded area (26) that provides a visual reference zone (27).

20 Claims, 6 Drawing Sheets

(51) Int. Cl.
B01D 35/143 (2006.01)
B01D 53/04 (2006.01)

(56) References Cited

U.S. PATENT DOCUMENTS

| | | |
|---|---|---|
| 4,510,193 A | 4/1985 | Blucher |
| 4,813,948 A | 3/1989 | Insley |
| 5,230,800 A | 7/1993 | Nelson |
| 5,338,340 A * | 8/1994 | Kasmark, Jr. ...... B01D 39/1623 55/486 |
| 7,063,733 B2 | 6/2006 | Mori |
| 7,235,115 B2 | 6/2007 | Duffy |
| 7,442,237 B1 | 10/2008 | Gardner |
| 7,626,072 B2 | 12/2009 | Mocadlo |
| 7,691,168 B2 | 4/2010 | Fox |
| 7,816,285 B2 | 10/2010 | MacDonald |
| 7,947,142 B2 | 5/2011 | Fox |
| 8,162,153 B2 | 4/2012 | Fox |
| 8,225,782 B2 | 7/2012 | Rakow |
| 9,539,532 B2 * | 1/2017 | Fox ................ B01D 46/0001 |
| 2004/0011204 A1 | 1/2004 | Both |
| 2004/0083896 A1 | 5/2004 | Mihaylov |
| 2008/0038976 A1 | 2/2008 | Berrigan |
| 2011/0290119 A1 | 12/2011 | Ylitalo |

FOREIGN PATENT DOCUMENTS

| | | |
|---|---|---|
| CN | 105521664 | 4/2016 |
| GB | 2288749 | 11/1995 |
| JP | H02126856 | 5/1990 |
| JP | 200246043 | 9/2003 |
| WO | WO 2016-003309 | 1/2016 |
| WO | WO 2016-186858 | 11/2016 |
| WO | WO 2017-066284 | 4/2017 |
| WO | WO 2017-106434 | 6/2017 |
| WO | WO 2017-106438 | 6/2017 |
| WO | WO 2017-160650 | 9/2017 |
| WO | WO 2018-023748 | 2/2018 |

* cited by examiner

AIR FILTER WITH VISUAL FILTER LIFE INDICATOR ZONE AND SORBENT-LOADED VISUAL REFERENCE ZONE

BACKGROUND

Filter life indicators are sometimes used in order that aspects of the filtration performance of an air filter can be ascertained or monitored.

SUMMARY

Herein is disclosed an air filter comprising a nonwoven fibrous filtration web comprising charged electret moities and with a major surface that includes at least one sorbent-free area configured to provide a visual filter life indicator zone, and at least one sorbent-loaded area configured to provide a visual reference zone. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Although terms such as "top", bottom", "upper", "lower", "under", "over", "front", "back", "up" and "down", and "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match. The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter. The term "configured to" and like terms is at least as restrictive as the term "adapted to", and requires actual design intention to perform the specified function rather than mere physical capability of performing such a function.

DETAILED DESCRIPTION

Figure 1:
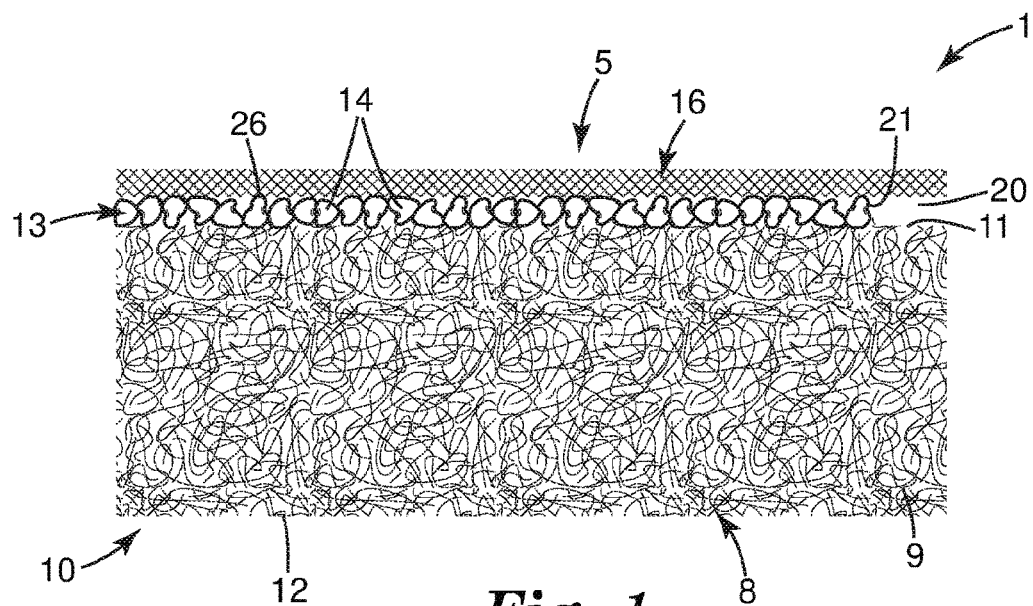
FIG. 1 is a side schematic cross sectional view of a portion of an exemplary air filter as disclosed herein.

Disclosed herein is an air filter 1 that comprises air filter media 10, as shown in exemplary embodiment in FIG. 1. In some embodiments, air filter 1 may be a frameless filter that is installable on a filter-support layer 50 of an air-handling system 100, as shown in exemplary embodiment in FIG. 2. In other embodiments, air filter 1 may be a framed filter as shown in exemplary embodiment in FIG. 7. In some embodiments air filter 1 may be rectangular in shape (which specifically includes square shapes) with four major lateral edges 4 and four corners; in such embodiments filter media 10 may thus have a generally rectangular perimeter (which does not preclude irregularities, notches, chamfered or angled corners, or the like, in the perimeter of filter media 10). Filter media 10 comprises a first major surface 11, which comprises an active particle-filtration area 5. By an active particle-filtration area is meant an area that is not occluded or blocked (e.g. by a portion of a perimeter frame or the like), so that the area can admit airflow thereinto so that airborne particles present in the airflow may be filtered. The active particle-filtration area 5 of first major surface 11 comprises at least one sorbent-free area 20 and at least one sorbent-loaded area 26. Filter media 10 also comprises second major surface 12. The entirety of second major surface 12 may be sorbent-free; or, if desired at least one sorbent-loaded area may be present on second major surface 12 (in addition to the at least one sorbent-loaded area that is present on first major surface 11).

Filter media 10 may comprise any suitable nonwoven fibrous particulate filtration web. Such materials may be chosen from, for example, meltblown, meltspun (e.g. spunbond), airlaid, or carded nonwoven webs, comprised of fibers of a composition chosen from e.g. polyolefins such as polypropylene, polyethylene, or mixtures, blends, or copolymers thereof, or from poly(lactic acid) and like materials. At least some of the fibers of filter media 10 will comprise charged electret moieties. By electret is meant a material (e.g. an organic polymeric material) that, after a suitable charging processes, exhibits a quasi-permanent electric charge. The presence of such electric charges may be characterized by an X-ray treatment Test as disclosed e.g. in U.S. Patent Application Publication No. 2011/0290119. In some embodiments, filter media 10 will meet the definition of a "charged" web (in terms of the change in Quality Factor (for particulate filtration) upon exposure to an X-ray treatment) found in U.S. Pat. No. 7,691,168. In various embodiments, filter media 10 will exhibit at least about 30, 40, or 50% filtration efficiency in a particle-filtration efficiency test (using NaCl particles) performed according to the methods disclosed in International Application No. PCT/CN2016/093657. In some embodiments, filter media 10 will exhibit a Quality Factor for particulate filtration of at least about 0.15, 0.3, 0.5, or 0.8, when tested according to the methods disclosed in the '657 application.

Electret fibers capable of being charged may be chosen from any suitable material, e.g. split fibrillated charged fibers as described in U.S. Pat. RE 30782. Such fibers can be formed into a nonwoven web by any suitable means. In some embodiments, filter media 10 can be a meltblown nonwoven web (e.g., such as disclosed in U.S. Pat. No. 4,813,948) or a meltspun (e.g. spunbonded) nonwoven web that comprises at least some fibers that comprise charged electret moieties. Nonwoven fibrous filter media that may be imparted with charged electret moieties and that may be particularly suitable for certain applications might include e.g. media of the general type described in U.S. Pat. No. 8,162,153 to Fox; media of the general type described in U.S. Patent Application Publication 20080038976 to Berrigan; and, media of the general type described in U.S. Patent Application Publication 20040011204 to Both, and media generally known as tribocharged media. Any suitable charging method may be used, chosen from e.g. corona charging, hydrocharging, tribocharging, and so on. In some embodiments, a filter media may be formed from pre-charged electret fibers; or, a filter media may be formed (e.g. collected as a mass of fibers and then consolidated into a nonwoven web) and then post-charged. If desired, the fibers of the media may comprise one or more charging additives, e.g. chosen from any of the additives described in International Patent Publication WO2016/033097.

The material of filter media 10 (e.g., nonwoven fibers 9 that make up fibrous filtration web 8) can include any desired additives or ancillary components (e.g. antioxidants, UV-stabilizers, processing additives, charging additives as noted above, sizing agents, and so on). However, from the discussions to follow it will be clear that filter media 10 should preferably contain no more than a minimal amount of dark-colored material in order for the arrangements disclosed herein to be achieved. Thus in various embodiments, the material of the filter media (e.g., the polymer resin of which nonwoven fibers 9 are comprised) will include less than about 2.0, 1.0, 0.5, 0.2, 0.1, or 0.05 weight percent of dark-color-imparting additives such as e.g. carbon black; dark blue, purple or black inks, dyes or pigments; and the like. In specific embodiments, the fibers of filtration web 8 may include a whitening pigment (e.g., calcium carbonate, titanium dioxide, barium sulfate, kaolin clay, and so on) so as to increase the initial whiteness of filter media 10. This may enhance the ease with which the remaining useful lifetime of the filter media can be visually assessed, as discussed below. Filter media 10 may be a multilayer construction (e.g. with a core layer of charged electret material sandwiched in between outer scrim layers) as long as the scrim layer(s) does not interfere with the arrangements herein (e.g., as long as the scrim exhibits sufficient optical transmissivity).

Sorbent-Loaded Zones and Sorbent-Free Zones

Figure 3:
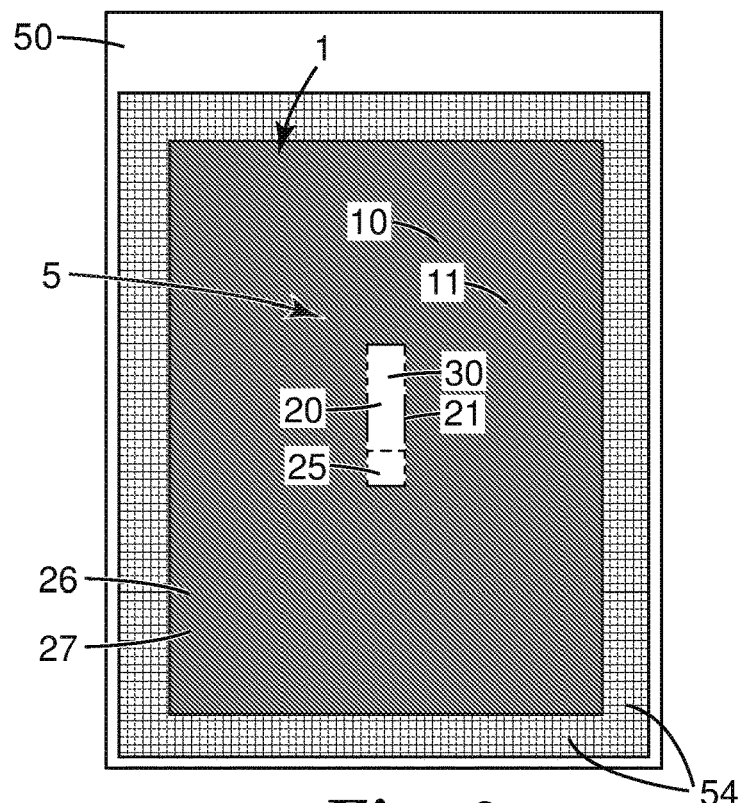
FIG. 3 is a front view of an exemplary air filter as initially installed on a filter-support layer.

The active particle-filtration area 5 of first major surface 11 of filter media 10 comprises at least one sorbent-free zone 20 that is configured to provide a visual filter life indicator zone 30 of air filter 1, as shown in exemplary embodiment in FIG. 3. By a visual filter life indicator zone is meant an area of first major surface 11 that can be visually inspected by a user, with the visual appearance of the indicator zone providing an indication of whether the filter media is approaching the end of its useful lifetime. By visual appearance is meant the appearance of the zone, to a human user in ordinary room light, on a light-to-dark spectrum (e.g., the "color" or "shade" of the zone on a white-black scale). The visual appearance of such an indicator zone will change appreciably as the filter is used, due to the accumulation of particles that are captured by the filter media, as discussed later in detail.

The active particle-filtration area 5 of first major surface 11 of filter media 10 also comprises at least one sorbent-loaded zone 26 that is configured to provide a visual filter life reference zone 27, as shown in exemplary embodiment in FIG. 3. By a visual filter life reference zone is meant an area of first major surface that can be visually inspected by a user, that exhibits an initial appearance that is significantly different from that of the indicator zone, and whose appearance does not change appreciably as the filter is used. The reference zone thus acts as a reference (e.g. a target) to which the visual appearance of the indicator zone can be compared. The visual appearance of the indicator zone approaching that of the reference zone is an indication that the filter media is approaching the end of its useful lifetime.

By a sorbent-loaded area is meant an area of first major surface 11 of filter media 10 on which a primary sorbent (i.e., a dark-colored sorbent such as activated carbon) is present at a loading of at least 20 grams per square meter ($g/m^2$). At and above such loadings, the primary sorbent particles may collectively impart a pronounced, and visually obvious, dark color or shade that contrasts with the inherent light color or shade of nonwoven fibrous web 8. In various embodiments, a sorbent-loaded area of major surface 11 may comprise a primary sorbent loading of at least about 40, 60, 80, 100, or 120 grams per square meter. It will be appreciated that although such loadings may increase the airflow resistance of the filter media somewhat, they will not completely occlude the filter media. So, the sorbent-loaded areas of air filter media 10 will still contribute to the particle filtration achieved by air filter 1.

By a sorbent-free area is meant an area of first major surface 11 of filter media 10 in which a primary sorbent is present at a loading of no greater than 20 grams per square meter. In various embodiments, a sorbent-free area of major surface 11 may comprise a primary sorbent loading of at most about 10, 5, 2, 1, 0.5, or 0.1 grams per square meter. It will be appreciated that at such low sorbent loadings (e.g. with sorbent being absent) the inherent color or shade of the nonwoven web (e.g. a white, off-white, light grey, tan or beige appearance) in a sorbent-free area will be apparent and will contrast sharply with the visual appearance of a neighboring sorbent-loaded area. It is emphasized that the term sorbent-free is used for convenience of description and that an area of filter media 10 does not necessarily have to be completely free of sorbent particles to qualify as being sorbent-free as defined herein. It will also be appreciated that the above-listed sorbent-loading values, although presented in units of grams per square meter, will be "local" values, applicable only over the extent of the particular sorbent-loaded area(s) or sorbent-free areas in question (which may be e.g. only a few square centimeters), rather than an overall value averaged over the entire active filtration area of the filter media.

Figure 2:
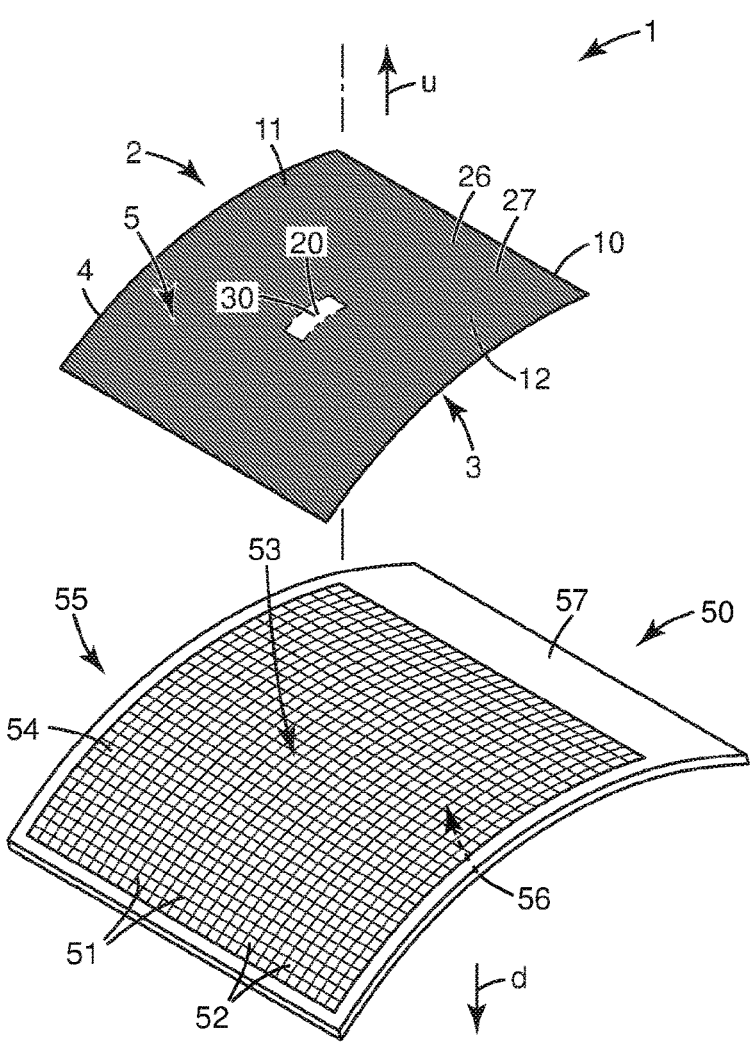
FIG. 2 is a perspective exploded view of an exemplary air filter installed on a filter-support layer of an air-handling system.

FIGS. 2 and 3 depict an air filter 1 comprising air filter media 10 comprising at least one sorbent-free area 20 configured to provide a visual filter life indicator zone 30, and at least one sorbent-loaded area 26 configured to provide a visual reference zone 27 for visual filter life indicator zone 30. When air filter 1 is first installed into an air-handling system, sorbent-free area(s) 20 will exhibit an initial light-colored appearance (e.g., a white or off-white color, as shown in FIG. 3). Sorbent-loaded area(s) 26 will exhibit an initial color that is much darker (due to the presence of e.g. activated carbon), e.g. very dark grey or black, also as shown in FIG. 3. There will thus be an easily recognizable contrast between the visual appearance of an indicator zone 30 provided by a sorbent-free area 20, and the visual appearance of a reference zone 27 provided by a sorbent-loaded area 26. In particular, boundaries 21 between indicator zone(s) 30 and reference zone(s) 27 may be easily discernable. Over time, as airborne particles are captured by the nonwoven fibrous filtration web 8 of filter media 10, sorbent-free area 20 will darken in appearance, as shown in an exemplary embodiment in FIG. 4. (This may be enhanced by any inherent dark color of at least some of the airborne particles, in particular to any soot particles that may be present among the airborne particles.)

While some airborne particles will also be captured by fibers of filtration web 8 that underlie a sorbent-loaded area 26, the dark color imparted by the sorbent particles will dominate the appearance of a sorbent-loaded area 26 such that any darkening of this area due to capture of airborne particles will be generally negligible. In other words, a sorbent-loaded area 26 will at least substantially retain its initial dark appearance during the usable lifetime of the filter and thus can act to provide a visual reference zone 27. Over time, visual filter life indicator zone 30 will darken so that it approaches visual reference zone 27 in appearance. A user may thus obtain an indication of whether the air filter media 10 of an air filter 1 is approaching the end of its useful lifetime for particulate filtration, by evaluating how closely, on a light-dark spectrum, the visual appearance of indicator zone 30 has come to resemble the visual appearance of reference zone 27.

It will be appreciated that the present arrangements use sorbent particles (including e.g. activated carbon) not only to capture gaseous or vaporous substances from an airstream, but also to collectively provide a reference zone whose visual appearance can be compared to that of a sorbent-free area of the air filter medium, to enhance the ability of a user to determine that a filter medium is approaching the end of its useful lifetime of the filter for particulate filtration. Moreover, the presence of the sorbent particles does not render the visual reference zone unable to perform filtration of airborne particles, meaning that such a reference zone can be included without decreasing the active area available to perform particle filtration.

As noted, the arrangements disclosed herein can advantageously allow a user to ascertain when a filter media is approaching the end of its "useful lifetime". As used herein, a "useful lifetime" of a filter media is defined as the time at which the particulate filtration efficiency of the filter has fallen below 50% of its initial value. For such purposes, particulate filtration efficiency can be evaluated using a percent penetration/filtration efficiency/filtration Quality Factor test method as described in the Working Examples herein. It is noted that a user may, if desired, choose to continue using an air filter 1 even after the end of its "useful lifetime"; conversely, a user may, if desired, choose to replace an air filter before it has reached the end of its "useful lifetime". That is, the terminology of a "useful lifetime" is used for convenience to characterize performance in the specific aspect of efficiency of particle filtration and does not imply that an air filter cannot perform at least some beneficial filtration (e.g. of particles and/or of gaseous or vaporous substances) after the "useful lifetime" is reached.

As filter media 10 approaches the end of its useful lifetime, sorbent-free area(s) 20 of air filter media 10 will exhibit a visual appearance that approaches that of sorbent-loaded area(s) 26. Such behavior may be evaluated e.g. by way of a ΔE (delta-E) difference in the L value in an L*a*b* color space (CIE2000). The CIE L*a*b* color space is a well known method of assessing color, with 0-100 on the L* axis representing the black-white range and with the so-called ΔE (delta-E) parameter representing a difference between two values e.g. on the L* axis. In various embodiments, sorbent-free area(s) 20 of filter media 10, before air filter 1 is installed in an air-handling system and exposed to an airstream comprising airborne particles, may exhibit an L* value of at least about 80, 85, 90, or 95. (As noted, if desired, the material of filter media 10 may include one or more whitening agents in order to increase the initial L* value of media 10 and to make the difference in visual appearance that occurs upon capture of particles by the sorbent-free area(s) of the filter media more readily apparent.) In various embodiments, sorbent-loaded area(s) 26 of filter media 10, before air filter 1 is installed in an air-handling system and exposed to an airstream comprising airborne particles, may exhibit an L* value of less than about 40, 30, 20, 10 or 5. (As noted below, a dark-colored non-sorbent filler, e.g. carbon black, may be mixed with the sorbent to render area(s) 26 darker in color if desired).

In various embodiments, before initial use of air filter 1, the L* axis ΔE of sorbent-free area(s) 20 relative to sorbent-loaded area(s) 26 may be at least about 40, 60, 80, or 90. In further embodiments, at the end of the useful lifetime of filter media 10, such an L* axis ΔE may have dropped to less than about 30, 20, 15, 10, 5, or 2. As noted, any darkening of the fibrous web itself in the sorbent-loaded areas will likely be masked by the dark color of the sorbent, so that any change in the visual appearance of the sorbent-loaded area(s) during use of the filter will likely be negligible.

It will be appreciated that the visual appearance of reference zone 27 can be set as desired. In some embodiments, reference zone 27 may be configured so that as the filter media reaches the end of its useful lifetime, the visual appearance of indicator zone 30 closely approaches that of reference zone 27 (e.g., as manifested by an L* axis ΔE of less than 10, 5 or 2). However, it is not strictly necessary that this be the case, as long as the user of the air filter is aware of what degree of closeness of visual appearance of zone 30 to zone 27 is indicative of the approach of the end of the useful lifetime of the filter. For instance, in some embodiments, at the end of a useful lifetime of the filter, a sorbent-free area 20 (that provides an indicator zone 30) may exhibit e.g. a dark grey color rather than an extremely dark (e.g. black) color; in such embodiments, the L* axis ΔE between zones 27 and 30 may be e.g. greater than 10.

In various embodiments, air filter 1 may be configured so that visual filter life indicator zone 30 and visual reference zone 27 may be visually inspected from the first side of filter media 10 (the side on which sorbent layer 13 is present); or, so that they may be inspected from the second, opposing side of air filter 1. (Some air filters may be inspectable from either side.) In the first approach, the contrast in visual appearance between sorbent-free indicator zone 30 and sorbent-loaded reference zone 27 will be inspected directly, e.g. in light that is reflected from the first side of filter media 10. In such embodiments, there may be no particular requirement for optical transmissivity of nonwoven fibrous filtration web 8. In the second approach, the contrast in visual appearance may be inspected at least in part by way of light that passes through the thickness of nonwoven fibrous filtration web 8. In such embodiments, web 8 will need to be sufficiently optically transmissive to allow the initial difference in appearance between sorbent-free indicator zone 30 and sorbent-loaded reference zone 27 to be observed, and to allow the decrease of this difference with use of air filter 1 to be observed. However, complete optical transparency is not necessarily required. It has been found that many potentially suitable nonwoven fibrous filtration webs are sufficiently optically transmissive to allow visual inspection from either the first or the second side, although it may be preferable to inspect from the first side.

Sorbents

Any suitable sorbent particles 14 or a mixture of sorbent particles of various types or compositions can be used, as long as the sorbent particles include at least some sorbent particles that are sufficiently dark (such particles will be referred to herein as primary sorbent particles) and are present (in a sorbent layer 13) at a sufficiently high area loading to achieve the effects discussed herein. In at least some embodiments, the primary sorbent particles are activated carbon particles, which are well known as being very dark in color. Primary sorbent particles (e.g. activated carbon) may be provided in any usable form including beads, flakes, granules or agglomerates. Primary sorbent particles may be configured to capture any desired gaseous or vaporous component from an airstream. At least some of the primary sorbent particles (e.g. activated carbon particles) may be impregnated with one or more additives as desired in order to enhance the ability of the particles to capture particular gaseous or vaporous substances. Such impregnation will not impact the ability of the primary sorbent particles to collectively provide a visual reference zone as disclosed herein.

In some embodiments primary sorbent particles may be mixed with one or more types of secondary sorbent particles (the term secondary sorbent particles denotes particles that exhibit at least some ability to capture a non-particulate airborne substance but that do not exhibit a sufficiently dark color to provide a visual reference zone in the absence of the primary sorbent particles). Materials that may be suitable for use as secondary sorbent particles include e.g. alumina and other metal oxides; sodium bicarbonate; metal particles (e.g., silver particles) that can remove a component from a fluid by adsorption, chemical reaction, or amalgamation; particulate catalytic agents such as hopcalite (which can catalyze the oxidation of carbon monoxide); clay and other minerals treated with acidic solutions such as acetic acid or alkaline solutions such as aqueous sodium hydroxide; molecular sieves and other zeolites; silica; biocides; fungicides and virucides. In particular embodiments, secondary sorbent particles may include any of the porous polymeric sorbents described in U.S. Provisional Patent Applications Nos. 62/269,613, 62/269,626, 62/298,089, and 62/307,831, all of which are incorporated by reference herein for this purpose. In some embodiments, a desired amount of dark-colored, non-sorbent particles may be mixed with the primary sorbent particles (and with any secondary sorbent particles, if present) to accentuate the effects disclosed herein. For example, particles of a dark filler such as carbon black may be added to the sorbent particles.

The (e.g. primary) sorbent particle size may vary as desired. In certain embodiments, the sorbent particles have a standard U.S. mesh size (rating) of at least about 12 mesh (corresponding to a nominal 1680 micrometer opening size), at least about 16 mesh (1190 micrometers), or at least about 20 mesh (840 micrometers). In further embodiments, the sorbent particles have a standard U.S mesh size (rating) no greater than about 325 mesh (44 micrometers), no greater than about 200 mesh (75 micrometers), no greater than about 100 mesh (150 micrometers), no greater than about 60 mesh (250 micrometers), no greater than about 50 mesh (300 micrometers), or no greater than about 45 mesh (355 micrometers). By way of a specific example, if the particle size of a material is described as 12×20 mesh, then 90% or more of the material will pass through a 12-mesh sieve (i.e. particles smaller than about 1680 micrometers will pass through a 12-mesh sieve) and be retained by a 20-mesh sieve (i.e. particles larger than about 841 micrometers will not pass through a 20-mesh sieve). Suitable sorbent particles include 12×20, 25×45, and 30×60 mesh sized granular activated carbon available from Kuraray Chemical Corporation, Canoga Park, Calif. Mixtures (e.g., bimodal mixtures) of sorbent particles having different size ranges may also be employed.

The presence of primary sorbent particles (and any secondary sorbent particles that may be present) will allow air filter media 10 to remove gaseous or vaporous substances from an airstream rather than e.g. performing only particle filtration. The capability of filter media 10 to remove gaseous or vaporous substances from an airstream may be characterized by way of a toluene removal efficiency test as disclosed in the Examples herein. In various embodiments, filter media 10 may exhibit a toluene removal efficiency of at least about 5, 10, 15, 20, or 25%, e.g. at a face velocity of about 75 cm/sec.

The attaching of primary sorbent particles 14 (and any secondary sorbent particles if present) to first major surface 11 of nonwoven fibrous filtration web 8 to form sorbent layer 13 may be done in any suitable manner. In some convenient embodiments, this can be done by providing an adhesive (e.g., a pressure-sensitive adhesive (PSA)) on first major surface 11. Such a PSA can be disposed on areas of surface 11 that are desired to become sorbent-loaded areas 26 of surface 11, by any suitable method. For example, a PSA precursor can be screen-printed onto such areas and liquid then removed from the precursor to leave behind PSA. In specific embodiments, a PSA precursor might be a solvent-borne solution from which solvent is removed; or, a PSA precursor might take the form of a water-borne emulsion or dispersion (e.g., a latex) which coagulates to provide the PSA upon removal of the water. In other approaches, a PSA precursor may be hot-melt-coated onto such areas and then cooled to solidify into a PSA. In more general terms, in various embodiments an adhesive might be a so-called hot-melt adhesive that is deposited onto surface 11 in molten or semi-molten form, followed by sorbent particles being deposited thereon, with the hot-melt adhesive then being allowed to cool and solidify. Such an adhesive might be e.g. pattern-coated in desired portions that are desired to become sorbent-loaded areas 26.

It is noted that even in a sorbent-loaded area 26, it may not be necessary that an adhesive be provided on surface 11 in a continuous manner (e.g., deposited as a layer that extends over the entirety of area 26 in an uninterrupted manner). Rather, the adhesive may be present at as low an area loading (e.g. coating weight per unit area) as can still provide adequate bonding of the sorbent particles to the fibers. This will minimize any effect of the adhesive on the airflow resistance of the air filter media. (In other words, the area coverage of the adhesive, and also the composition of the adhesive or adhesive precursor, may be chosen to ensure that the adhesive does not clog the pores of the nonwoven fibrous web in such manner as to unacceptably increase the pressure drop needed to achieve adequate airflow through the web.) In various embodiments, an adhesive may be provided in area(s) 26 of major surface 11, at an area loading of at least about 2, 4 or 6 grams per square meter. In further embodiments, the adhesive may be provided at an area loading of at most about 16, 14, 12 or 10 grams per square meter. In particular embodiments in which a PSA is used, any suitable PSA may be chosen, and may be deposited according to the desired size and pattern of sorbent-loaded areas 26, e.g. by screen printing, gravure coating, roll coating, or, in general, any coating or spraying operation used in combination with a suitable mask or stencil in order to provide the PSA in the desired pattern. Suitable PSAs and/or PSA precursors may be chosen from e.g. the products available from BASF (Charlotte, N.C.) under the trade designation ACRONAL; the products available from 3M Company (St. Paul Minn.) under the trade designations SUPER 77 MULTIPURPOSE SPRAY ADHESIVE and HI STRENGTH 90 SPRAY ADHESIVE; the product available from ITW (Danvers, Mass.) under the trade designation DEVCON 5 MINUTE EPOXY; and the product available from Gorilla Glue, Inc. (Cincinnati, Ohio) under the trade designation GORILLA GLUE. With the PSA in place, the sorbent(s) can be deposited, e.g. gravity-dropped, onto the PSA, after which any non-bonded sorbent particles may be removed. As discussed later, a cover layer (e.g., a cover web) may be provided atop the thus-formed sorbent layer 13 if desired.

By a sorbent-loaded area is meant that the area comprises a layer of sorbent particles (e.g. a monolayer, although the sorbent particles may occasionally be present in local arrangements resembling e.g. small stacks, piles, bunches, etc.) that are present on a major surface of a fibrous web and are bonded (e.g., by an adhesive) to fiber portions that provide the major surface of the fibrous web. Such an arrangement will be distinguished from arrangements in which sorbent particles are embedded within the interior of a fibrous web and are held within the web e.g. by way of physical entrapment by the fibers and/or by way of adhesive fibers, binding resins, or the like, that are present within the interior of the web. That is, although in the present arrangement there may be some incidental penetration of a small number of sorbent particles into the interior of the web, the present arrangement will be distinguished from any arrangement in which significant numbers of sorbent particles are purposefully embedded within the interior of a fibrous web.

In some embodiments, filter media 10 may be provided with a fibrous nonwoven cover layer 16, as shown in exemplary embodiment in FIG. 1. Such a cover layer may be provided for aesthetic reasons and/or to aid in retaining sorbent particles 14 that might otherwise become dislodged from first major surface 11 of nonwoven fibrous filtration web 8 e.g. during processing and/or during the life of the filter. Cover layer 16 may be affixed to nonwoven fibrous filtration web 8 so that sorbent particles 14 of the at least one sorbent-loaded area 26 of first major surface 11 of nonwoven fibrous filtration web 8 are present as a layer 13 that is sandwiched between first major surface 11 of nonwoven fibrous filtration web 8, and a major surface of the cover layer, as shown in exemplary embodiment in FIG. 1. Cover layer 16 may be affixed to web 8 (e.g., to major surface 11 of web 8) by any suitable means, e.g. adhesive bonding, ultrasonic bonding, thermal bonding (e.g. heated calendering), needle-tacking, and so on. If desired, points of attachment of cover layer 16 to web 8 may be preferentially located in sorbent-free areas 20. In some embodiments, cover layer 16 may be attached to nonwoven web 8 around the entirety of the perimeter of web 8 (e.g. in a continuous, uninterrupted manner), with optional points of attachment within the laterally-interior area (e.g. active particle-filtration area 5) of web 8.

Cover layer 16 may be chosen so as to exhibit a relatively low airflow resistance. In some embodiments, e.g. if visual filter life indicator zone 30 and visual reference zone 27 are to be inspected from the first side of air filter 1 (that is, from the side on which sorbent layer 13 is located) and a cover layer 16 is present on this side of the air filter, such a cover layer may be chosen to be sufficiently optically transmissive that zones 30 and 27 are clearly visible through cover layer 16. For example, cover layer 16 may take the form of a nonwoven fibrous web (e.g. a scrim) that exhibits an area density of less than about 20 grams per square meter and a thickness of less than about 1 mm. In further embodiments, such a cover layer can exhibit an area density of less than about 16, 14, 12, or 10 grams per square meter, and can exhibit a thickness of less than about 0.8, 0.6, 0.4, 0.1, or 0.1 mm. In some embodiments, such a cover layer may be at least substantially impenetrable by sorbent particles (defined herein as meaning that, in ordinary use of filter 1, no more than 0.5 percent by weight of sorbent particles are able to escape through cover layer 16). In some embodiments, cover layer 16 may be coterminous (i.e., occupying at least essentially the exact size and shape, and in complete overlapping relation) with the entirety of web 8.

The percentage of active particle-filtration area 5 of filter media 10 that is occupied by sorbent-loaded area(s) 26 may be set at the highest possible value (e.g. to achieve the highest possible capture of gaseous or vaporous substances) that still allows the airflow resistance of the filter to remain in a desirably low range. In various embodiments, the at least one sorbent-loaded area may occupy at least about 50, 60, 70, 80, 90, or 95% of active particle-filtration area 5 of filter media 10. In further embodiments, the at least one sorbent-loaded area may occupy at most about 98, 96, 91, 86, or 81% of the active particle-filtration area.

Figure 7:
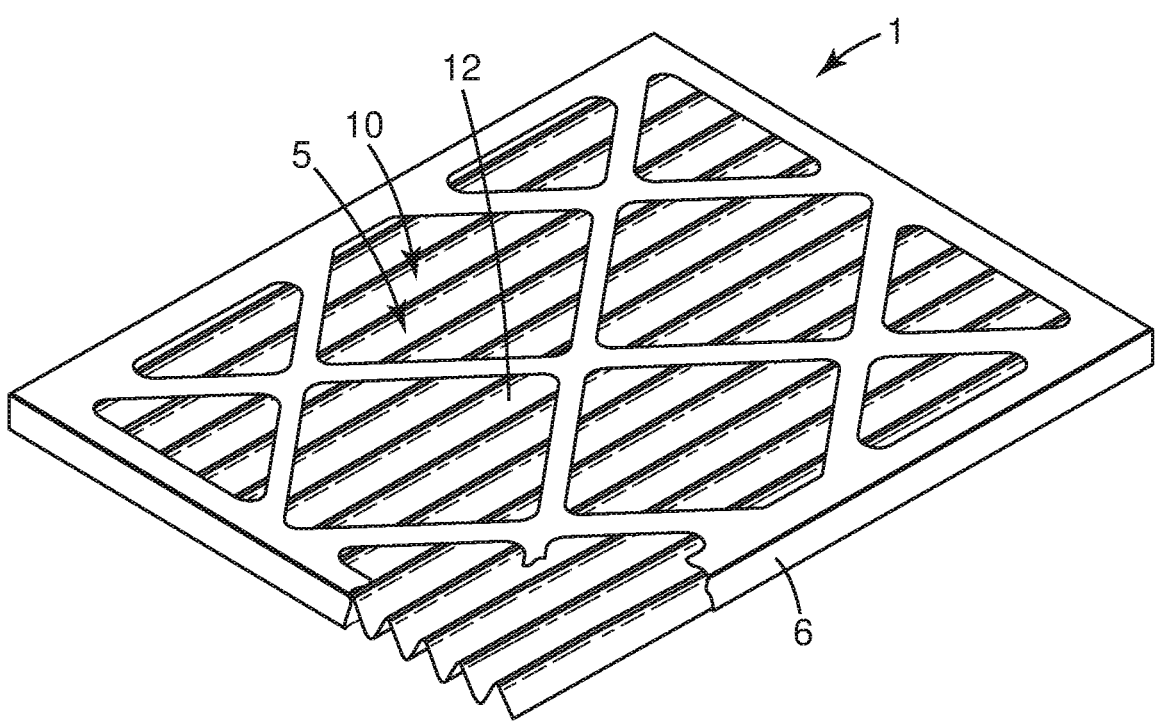
FIG. 7 is a perspective view of an exemplary framed, non-conformable air filter.

In some embodiments (e.g. as in FIGS. 2-4), a sorbent-free area 20 of filter media 10 may be limited to a single, relatively small patch that merely needs to be of sufficient size to be visually inspectable by a user in conditions of ordinary room light. In other embodiments, multiple, discrete sorbent-free areas 20 may be present, e.g. along with multiple, discrete sorbent-loaded areas 26, as in the exemplary design of FIG. 5. In various embodiments, sorbent-free area(s) 20 of filter media 10 may exhibit a collective size of at least about 1, 2, 4, 8, or 12 square centimeters. In further embodiments, sorbent-free area(s) may exhibit a collective size of at most about 100, 80, 60, 40 or 20 square centimeters. In some embodiments, sorbent-free area(s) 20 may occupy at least about 4, 8, 12, 20, or 28 percent of the total area of filter media 10 of air filter 1. In further embodiments, sorbent-free area(s) 20 may occupy at most about 30, 20, 15, or 12 percent of the total area of filter media 10 of air filter 1. Sorbent-free area(s) 20 and sorbent-loaded area(s) 26 may be provided in any desired geometric shape, e.g. for aesthetic reasons. For example, they may be present in stripes as in FIG. 5. In some embodiments, such areas may be in the form of lettering or logos. In some embodiments, filter media 10 may comprise one or more sorbent-free areas in the form of a strip 23 along a perimeter edge of the filter media, as depicted in FIG. 5. (In particular embodiments of this type, a sorbent-free "picture-frame" border may extend around the entire perimeter of filter media 10, as in FIG. 5.) In some embodiments, such a strip or border 23 may be occluded or blocked (e.g. by a perimeter frame as shown in FIG. 7) so as to not be visible to an observer and also so as to not perform any significant filtration. In such cases, the portion of filter media 10 occupied by the strip will not be a part of the active filtration area 5 of the filter media and will not be included in calculations of the percentage of sorbent-free areas. However, in many embodiments (e.g. with unframed filters of the type depicted in FIGS. 2-5) such a strip/border will be a part of the active filtration area 5 and will be included in such calculations.

Figure 4:
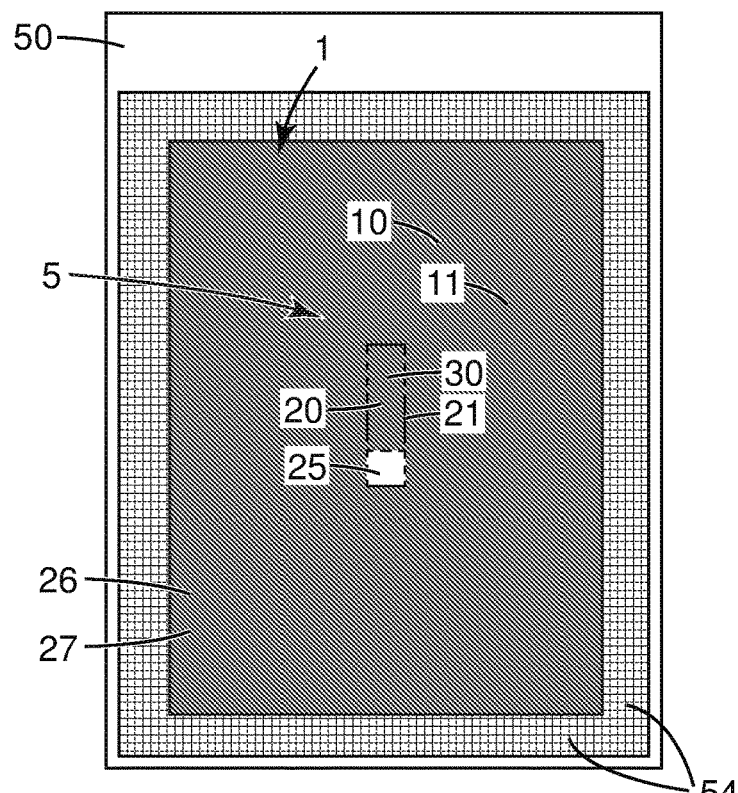
FIG. 4 is a front view of the exemplary air filter of FIG. 3 after a period of use.
Figure 5:
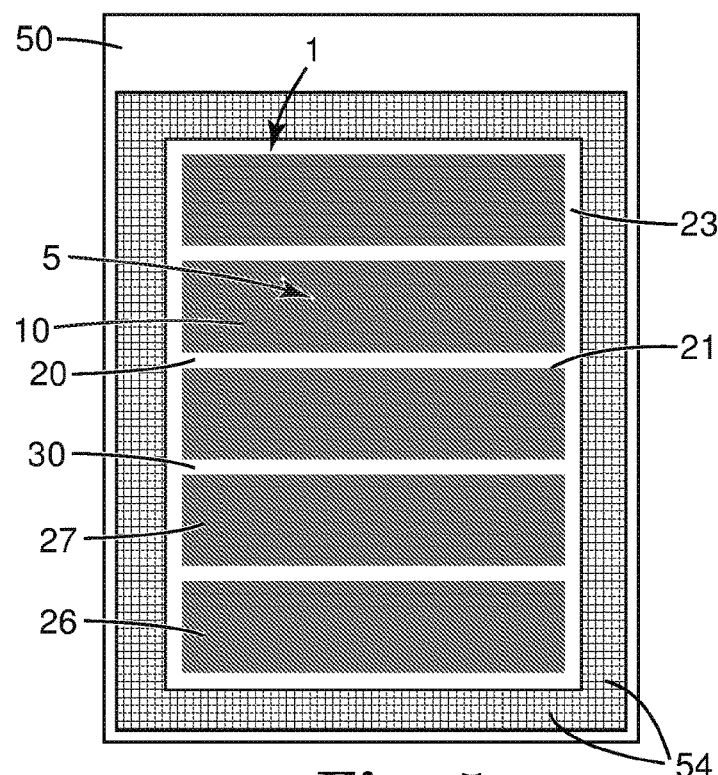
FIG. 5 is a front view of another exemplary air filter as initially installed on a filter-support layer.

In some embodiments, a sorbent-free area 20 of air filter media 10 may comprise at least one passivated region 25 as shown in exemplary embodiments in FIGS. 3 and 4. By a passivated region is meant a particular region of a sorbent-free area 20 of air filter media 10 that is not capable of capturing a significant number of airborne particles and that, during use of the air filter, at least generally retains its original visual appearance even as other, unpassivated regions of sorbent-free area 20 become significantly discolored (darken) due to the capture of airborne particles. Such a region may be physically passivated, meaning that airflow through the region is physically blocked so that little or no airflow can occur through this region of the filter media thus allowing few or no airborne particles to be captured in this region of the media. Or, it may be chemically passivated, meaning that even though air is still be able to flow into and through this region of the media, in this region the media has been chemically processed (e.g. the region may include few or no charged electret moities) so that it is not capable of capturing significant quantities of airborne particles that pass through this region of the media. Both of these approaches are described and discussed in detail in U.S. patent application Ser. No. 16/319,735 (published as US2019/151787) and in International Application No. PCT/CN2016/093657 (published as WO2018/023748), filed 5 Aug. 2016, of which the '735 U.S. application is a national stage filing under 35 U.S.C. 371. Both of these applications (each entitled AIR FILTER WITH PASSIVATED FILTER LIFE INDICATOR) are incorporated by reference in their entirety herein.

During use of an air filter 1 of this general type, a sorbent-free area of filter media 10 that is not passivated (e.g., the area designated 20 in FIGS. 3 and 4) will exhibit a gradual change in appearance (i.e., will darken in color) due to capture of airborne particles, as discussed in detail above. In contrast, during use of air filter 1, a sorbent-free, passivated region (e.g., the area designated 25 in FIGS. 3 and 4) may exhibit little change from its initial appearance. In other words, such a passivated region 25 may largely retain its initial (e.g. white) color as shown in exemplary embodiment in FIG. 4. Such a passivated region 25 may thus provide a visual baseline zone of the air filter. In such embodiments, a user will not be limited to inspecting the visual appearance of a sorbent-free (unpassivated) visual filter life indicator zone 20/30 to see how closely its visual appearance matches that of a sorbent-loaded visual reference zone 26/27 as discussed above. Rather, the user may also evaluate how much the appearance of the sorbent-free, unpassivated zone 20/30 has diverged from the appearance of a baseline zone provided by sorbent-free, passivated region 25. Such arrangements can further enhance the ability of a user to monitor the usable filter lifetime of air filter 1.

Air filter 1 as disclosed herein may be used in any air-handling system. Such an air-handling system might be e.g. a heating-ventilation-air-condition (HVAC) system (whether a centralized system or a so-called mini-split system as described below), a room air purifier, a cabin air filter for a vehicle, a filter for an internal combustion engines, and so on.

Figure 6:
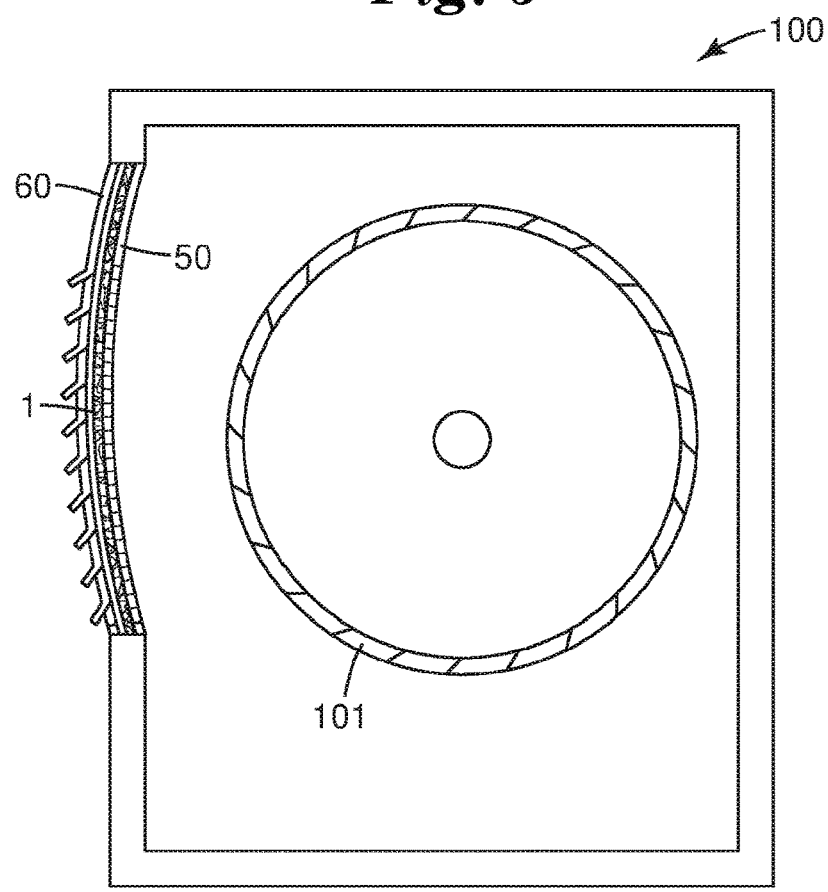
FIG. 6 is a side schematic cross sectional view of a portion of an exemplary air-handling system with an exemplary air filter installed therein.

With reference to the exemplary design of FIGS. 2 and 6, in some embodiments air filter 1 may be installed on a filter-support layer 50 of an air-handling system 100. In particular embodiments, air filter 1 may be installed in an air-handling system that is a so-called mini-split air-handling (e.g. HVAC or air conditioning) system. Mini-split systems (sometimes referred to as "ductless" systems) often collect air locally via a single air return and comprise a blower that is designed to recirculate air within a single room, in contrast to e.g. whole-house, centralized HVAC systems. (Representative mini-split HVAC systems include e.g. the products available from Fujitsu (Tokyo, JP) under the trade designation HALCYON.)

It is noted that FIG. 6 depicts an intake portion of a mini-split air-handling system in idealized, generic representation and is non-limiting. For example, while an air filter is typically positioned upstream of blower 101 (e.g. so that the filter can help to protect blower 101 and thermal-exchange components of the air-handling system from particulate debris), filter 1 is not necessarily required to be in close physical proximity to blower 101. If desired (for e.g. aesthetic purposes and/or to protect filter 1 from damage) a filter cover 60 may be positioned upstream of filter 1 as depicted in FIG. 1. Filter cover 60 should allow sufficient airflow to enable the functioning of the air-handling system and thus may be e.g. a perforated sheet material, a mesh or screen, a louvered or windowed material, and so on.

As shown in closer detail in the exploded view of FIG. 2, in some embodiments air filter 1 will be conformed to the shape of an upstream face 55 of an arcuate filter-support layer 50 of an air-handling system. In such embodiments, air filter media 10 will be conformable; moreover, no rigidifying perimeter support frame being present, air filter 1 will likewise be conformable. The conformability is reversible and repeatable and can be performed manually by a user of air filter 1, without the need for any special tools. Such an air filter, not bearing any kind of rigidifying frame or structure, is distinguished e.g. from framed air filters that are permanently held in a planar configuration (irrespective of any local deviations due to e.g. a filter media being pleated) and from so-called cartridge filters that comprise one or more layers of filter media held permanently in an arcuate configuration.

In some embodiments, e.g. in order to be conformable as described herein, filter media 10 may advantageously exhibit a relatively low stiffness. In some embodiments, the stiffness of the media may be characterized by a Taber Stiffness (measured as described in U.S. Pat. No. 7,235,115, which is incorporated by reference herein for this purpose). In various embodiments, filter media 10 may be comprised of a material that exhibits a Taber Stiffness of less than 1.0, 0.8, 0.6, or 0.4 Taber Stiffness Units. In some embodiments, the stiffness of the media may be characterized by a Gurley Stiffness (measured as described in U.S. Pat. No. 7,947,142, which is incorporated by reference herein for this purpose). In various embodiments, filter media 10 may be comprised of a material that exhibits a Gurley Stiffness of less than 100, 80, or 60 mg.

By definition, a frameless filter 1 and filter media 10 thereof does not include any kind of rigidifying perimeter support frame. However, this does not preclude the presence of one or more ancillary components e.g. proximate an edge of filter media 10. Such a component will be described by the term "border strip" for convenience herein. By definition, any such border strip or strips must serve some function (e.g., a fastening function, a decorative function, and so on) other than rigidifying filter 1 so that filter 1 cannot be conformed.

In many embodiments in which air filter 1 is installed in a mini-split air handling system, air filter 1 (e.g., side 3 thereof) may be in direct contact with upstream face 55 of filter-support layer 50. In such embodiments air filter 1 may thus comprise an upstream side 2 and a downstream side 3. In such embodiments it may be convenient for first major surface 11 of air filter 1 (the sorbent-loaded side) to be on the upstream side of the air filter. In a typical mini-split air handling system, filter-support layer 50 comprises an air-transmissive area 53 that comprises through-openings 52 through which air can easily pass to reach the interior of the air-handling system intake portion. However, air-transmissive area 53 also comprises solid portions 51 that serve to support filter 1. Such solid portions 51 may take the form of e.g. struts of a grid or filaments of a mesh or screen as in the exemplary embodiment of FIG. 6; or, air-transmissive area 53 may take the form of a solid sheet material with numerous perforations extending therethrough.

In some embodiments, one or more relatively (e.g., completely) non-air-transmissive areas of layer 50 may be provided (one such area 57 is shown in exemplary embodiment in FIG. 2). Such areas may e.g. facilitate attaching filter-support layer 50 to the other components of the air-handling system, installing filter 1 on filter-support layer 50, or may serve any other purpose. Filter-support layer 50 (e.g., at least the air-transmissive area 53 thereof) may conveniently be provided in an at least quasi-permanent arcuate shape. Filter 1 may be conformed to match that shape when installed on filter-support layer 50. However, in some embodiments, a filter support layer 50 may not necessarily exhibit an arcuate shape, and does not necessarily have to be in close proximity to the blower fan of an air-handling system. For example, in some embodiments a mesh screen, louvered cover, perforated grille, or the like, of an air intake or air outlet (e.g. a register) of an air handling system may serve as a filter support layer on which a filter 1 as disclosed herein may be mounted.

A filter 1 may be installed e.g. on an upstream face 55 of a filter-support layer 50 by any suitable means. For example, adhesive strips (e.g., at one or more edges 4 of filter 1) may be provided which can adhesively attach one or more edges of filter 1 to receiving areas of filter-support layer 50. Or, any kind of mechanical fastening system (such as the hook and loop systems mentioned earlier) may be used. In some embodiments, filter 1 (as supplied to an end user) may thus have components mounted thereto to facilitate installation onto filter-support layer 50. In other embodiments, filter 1 may simply consist of a sheet of air filter media 10 (including a sorbent layer, and a cover layer if present). In such cases, filter-support layer 50 may have components (e.g. pins) e.g. at corners of filter-support layer 50, onto which filter 1 may be impaled. Or, filter-support layer 50 may comprise one or more deformable or non-deformable clips or the like. In some embodiments, fasteners that are supplied separately from filter 1 and from filter-support layer 50 may be used.

It will be appreciated that in some embodiments (e.g., in which one or more ends of filter 1 are wrapped around one or more respective ends of filter-support layer 50 and are fastened to downstream face 56 thereof), filter 1 may not necessarily be directly attached or adhered to air-transmissive area 53 of filter-support layer 50 (or, to any portion of upstream face 55 of filter-support layer 50). The concept of filter 1 being installed on an upstream face 55 of a filter-support layer 50 thus does not necessarily require actual direct attachment of the filter to the upstream face. Moreover, in some embodiments the installation may not involve any direct "attachment" of filter 1 to filter-support layer 50 at all. For example, filter 1 may be held in place on the upstream face of filter-support layer 50 by the pressure of being sandwiched between filter cover 60 and filter-support layer 50. Or, ends of filter 1 may be wrapped around edges of filter-support layer 50 and held by pressure between the edges of filter-support layer 50, and surfaces of some other component of the air-handling system, so as to maintain filter 1 in the desired location relative to filter-support layer 50. All such configurations fall under the general category of installing filter 1 on the upstream face of a filter-support layer 50 of an air-handling system.

In some embodiments an air filter 1 need not necessarily overlie an entire air-transmissive area 53 of a filter-support layer 50. That is, filter 1 may be configured (e.g., shaped and sized) so that when it is installed on the upstream face 55 of filter-support layer 50, at least one bypass region 54 is present in some area of filter-support layer 50 (e.g., near one or more edges thereof) as shown in exemplary embodiment in FIGS. 2-5, that allows air to pass through filter-support layer 50 without passing through filter 1. Thus in various embodiments, filter 1 may be configured so that, when it is installed on filter-support layer 50, a bypass ratio (defined as the ratio of the area of bypass region 54 to the total air-transmissive area 53 of filter-support layer 50) is obtained that is at least about 15, 20, 25, or 30%. In other words, in such embodiments air filter media 10 will occupy less than 85, 80, 75, or 70% of the nominal air-transmissive area of filter-support screen. (The terminology nominal is used to denote that any small area occupied by e.g. the solid strands of a filter-support screen 50 will be disregarded in such calculations.) It is noted that in many embodiments filter-support layer 50 may be e.g. a mesh or screen with relatively small through-hole sizes so that any relatively large particulate debris (e.g., pet hair, dirt, and so on) that may bypass filter 1 may still be captured rather than reaching the fan or blower of the air-handling system.

A high-bypass air-handling system may rely on multiple passes of air through the air-handling system (e.g. by recirculating room air into the system) in order to achieve the desired air filtration. It will be appreciated that such systems are distinguished from e.g. centralized HVAC systems in which single-pass filtration is desired (that is, in which essentially no air is to be returned to a centralized air-distribution blower that has not first passed through a filter) and in which an air filter is typically installed at a nominally 0% bypass ratio. In a high-bypass configuration, the air-handling system may be operated as desired (for example to continuously or semi-continuously recirculate air, e.g. within a room). The visual appearance of the air filter (e.g. the upstream face of the filter, which will be visible without having to remove the filter from the filter-support layer) can be monitored at desired intervals.

In some embodiments (e.g. as shown in FIG. 7) filter media 10 may comprise a support frame 6 (made e.g. of any suitable material such as chipboard, and in the form of e.g. a channel frame or a pinch frame, as is well known) that is mounted on the perimeter of filter media 10 so that air filter 1 is a framed air filter. It will be appreciated that such a framed filter may not necessarily have to be installed onto the upstream surface of a filter-support layer in the manner described above. In particular, such a framed filter need not be conformable into an arcuate shape (and will in fact not be conformable). Rather, in many air-handling systems (e.g. centralized HVAC systems), a non-arcuate, framed air filter is inserted into a slot of the air-handling system so that portions of the filter frame are seated against retaining flanges of the air-handling system, rather than the filter being conformed to a filter-support layer and supported thereby.

In some embodiments (irrespective of whether filter media 10 is framed or frameless or is conformable or not) filter media 10 is unpleated (meaning that no identifiable pleats with a pleat height of greater than 1.0 mm are present). In other embodiments (again, irrespective of whether filter media 10 is framed or frameless or is conformable or not) filter media 10 may be pleated (e.g. as shown in FIG. 7), for example with a pleat height in the range of about 150, 100, 50, 20, 15, 10, 5, 4, 3 or 2 mm. Filter media 10 can be pleated by any suitable method, e.g. rotary-score pleating, blade-pleating, or processing the media through a set of corrugating gears. (In the particular arrangement of FIG. 7, air filter 1 is depicted from the second side with area(s) 26 not being visible in this view.)

LIST OF EXEMPLARY EMBODIMENTS

Embodiment 1 is an air filter comprising an air filter media that comprises a visual filter life indicator zone and a visual reference zone, the air filter media comprising: a nonwoven fibrous filtration web comprising at least some fibers that comprise charged electret moities, wherein the nonwoven fibrous filtration web comprises a first major surface with an active particle-filtration area that includes at least one sorbent-free area and at least one sorbent-loaded area, and wherein the at least one sorbent-free area is configured to provide a visual filter life indicator zone of the air filter, wherein the at least one sorbent-loaded area is configured to provide a visual reference zone for the visual filter life indicator zone.

Embodiment 2 is the air filter of embodiment 1 wherein in the sorbent-loaded area, sorbent particles are adhesively bonded to fiber portions that provide the first major surface of the nonwoven fibrous filtration web.

Embodiment 3 is the air filter of any of embodiments 1-2 wherein the at least one sorbent-loaded area occupies at least about 50 percent of the active particle-filtration area of the first major surface of the nonwoven fibrous filtration web, and wherein the at least one sorbent-free area occupies at most about 50 percent of the active particle-filtration area of the first major surface of the nonwoven fibrous filtration web. Embodiment 4 is the air filter of any of embodiments 1-2 wherein the at least one sorbent-loaded area occupies at least about 70 percent of the active particle-filtration area of the first major surface of the nonwoven fibrous filtration web, and wherein the at least one sorbent-free area occupies at most about 30 percent of the active particle-filtration area of the first major surface of the nonwoven fibrous filtration web.

Embodiment 5 is the air filter of any of embodiments 1-4 wherein in the at least one sorbent-loaded area, sorbent particles are present on the first major surface of the nonwoven fibrous filtration web at a loading of at least about 60 grams per square meter, and wherein in the at least one sorbent-free area, sorbent particles are present on the first major surface of the nonwoven fibrous filtration web at a loading of at most about 5 grams per square meter. Embodiment 6 is the air filter of any of embodiments 1-4 wherein in the at least one sorbent-loaded area, sorbent particles are present on the first major surface of the nonwoven fibrous filtration web at a loading of at least about 80 grams per square meter, and wherein in the at least one sorbent-free area, sorbent particles are present on the first major surface of the nonwoven fibrous filtration web at a loading of at most about 1 gram per square meter.

Embodiment 7 is the air filter of any of embodiments 1-6 wherein the sorbent-loaded area comprises primary sorbent particles that are mixed with one or more types of secondary sorbent particles. Embodiment 8 is the air filter of any of embodiments 1-7 wherein in the at least one sorbent-loaded area, sorbent particles are present that comprise at least some of activated carbon particles. Embodiment 9 is the air filter of embodiment 8 wherein the activated carbon particles exhibit a mesh size that is from about 20 mesh to about 100 mesh.

Embodiment 10 is the air filter of any of embodiments 1-9 wherein the at least one sorbent-free area is provided in the form of a plurality of discrete sorbent-free areas. Embodiment 11 is the air filter of any of embodiments 1-10 wherein the at least one sorbent-loaded area is provided in the form of a plurality of discrete sorbent-loaded areas.

Embodiment 12 is the air filter of any of embodiments 1-11 wherein the nonwoven fibrous filtration web exhibits a particle Filtration Efficiency of at least about 50%.

Embodiment 13 is the air filter of any of embodiments 1-12 wherein the at least one sorbent-free area of the nonwoven fibrous filtration web comprises at least one region that is a passivated region that is configured to provide a visual baseline zone of the air filter.

Embodiment 14 is the air filter of any of embodiments 1-13 wherein the air filter is a high bypass ratio air filter comprising a conformable, unframed air filter media that is configured to be installed on a portion of an upstream face of a filter-support layer of an air-handling system, in a high bypass ratio configuration in which the air filter media occupies less than 85% of a nominal air-transmissive area of the filter-support layer.

Embodiment 15 is the air filter of any of embodiments 1-14 wherein the air filter media is conformable into an arcuate shape so that the filter media can be installed on an upstream face of an arcuate filter-support layer of an air-handling system.

Embodiment 16 is the air filter of any of embodiments 1-14 wherein the filter media is pleated and wherein a perimeter support frame is mounted to a perimeter of the filter media.

Embodiment 17 is the air filter of any of embodiments 1-15 wherein the filter media is unpleated.

Embodiment 18 is the air filter of any of embodiments 1-17 further comprising a nonwoven fibrous cover web that is affixed to the nonwoven fibrous filtration web so that sorbent particles of the at least one sorbent-loaded area of the first major surface of the nonwoven fibrous filtration web are present as a layer that is sandwiched between the first major surface of the nonwoven fibrous filtration web, and a major surface of the cover web, wherein the cover web exhibits an area density of less than about 20 grams per square meter and a thickness of less than about 1 mm and is at least substantially impenetrable by the sorbent particles.

Embodiment 19 is the air filter of any of embodiments 1-19 wherein at least some fibers of the nonwoven fibrous filtration web are comprised of melt-processable polymeric resin that includes a white pigment.

Embodiment 20 is a method of installing, visually monitoring, and replacing an air filter, the method comprising: a) installing the air filter of any of embodiments 1-19 in an air-handling system; b) periodically visually inspecting the air filter so as to ascertain how closely a visual appearance of the at least one sorbent-free area approaches a visual appearance of the at least one sorbent-loaded area; optionally repeating step b) one or more additional times; and, c) when the visual appearance of the at least one sorbent-free area is observed to approach the visual appearance of the at least one sorbent-loaded area to a particular degree, removing the air filter from the air-handling system.

EXAMPLES

Test Methods

% Penetration, Filtration Efficiency, Pressure Drop, and Quality Factor

Percent penetration, filtration efficiency, pressure drop and the filtration Quality Factor (QF) of a filter media sample can be determined using the apparatus and methods in the aforementioned '657 International Application. Such methods use a challenge aerosol containing NaCl (sodium chloride) particles, delivered at a flow rate of approximately 85 liters/min to provide a face velocity of 14 cm/s, and evaluated using a TSI™ Model 8130 high-speed automated filter tester (commercially available from TSI Inc.). For NaCl testing, the aerosol may contain particles with a diameter of approximately 0.26 μm mass mean diameter, and the Automated Filter Tester may be operated with the heater on and the particle neutralizer on. Calibrated photometers may be employed at the filter inlet and outlet to measure the particle concentration and thus to obtain the % particle penetration through the filter. Filtration efficiency can be calculated as 100 minus the % particle penetration (and is reported in percent). An MKS pressure transducer (commercially available from MKS Instruments) may be employed to measure pressure drop (ΔP, mm H2O) through the filter. The equation:

$$QF = \frac{-\ln\left(\frac{\% \text{ Particle Penetration}}{100}\right)}{\Delta P}$$

may be used to calculate QF. Units of QF are inverse pressure drop (reported in 1/mm $H_2O$).

Dust Exposure Test

Dust Exposure Testing is performed in general accordance with ASHRAE (American Society of Heating, Refrigerating and Air-Conditioning Engineers)/ANSI (American National Standards Institute) Standard 52.2-2012: Method of Testing General Ventilation Air-Cleaning Devices for Removal Efficiency by Particle Size, at a face velocity of approximately 200 feet per minute.

Toluene Removal Efficiency

A toluene removal efficiency test may be performed on samples of filter media, against a challenge of 40 parts per million (by volume) toluene at 50% relative humidity and a 245 LPM air flow (0.75 m/s face velocity). Toluene vapor may be generated by heating a liquid toluene solution in a 50% humid air stream. Toluene concentration can be measured using a photoacoustic detector from California Analytical Instruments. Filter toluene efficiency can be calculated from the toluene concentration (C) in the flowing airstream upstream and downstream of the filter media sample, by the following relationship: % Efficiency=100* $(1-C_{downstream}(\text{filter in use})/C_{downstream}(\text{filter not in use}))$. Often, the efficiency may decline gradually over a testing period (e.g. as the sorbent captures additional toluene); for a standard reference point, the toluene removal efficiency after three minutes of toluene exposure may be used. For the purposes of such testing, a filter media sample of any convenient size may be used, as long as the ratio of sorbent-loaded area to sorbent-free area of the particular sample tested is representative of that of the filter media as it is used in a filter. Airflow resistance (pressure drop) may also be obtained in such testing. A toluene-removal quality factor may be obtained, which is calculated in analogous manner to the above-presented particulate-filtration quality factor, except that % toluene penetration is measured and used, rather than % particle filtration.

Working Examples

Filter media (a nonwoven web) was obtained from 3M Company, St. Paul Minn., of the general type described in U.S. Pat. No. 5,230,800 (comprising charged electret fibers made in general accordance with the procedures described U.S. Pat. Reissue Nos. 30782 and 31285). The filter media was unpleated and exhibited a white color.

A pressure-sensitive adhesive precursor was obtained from BASF (Charlotte, N.C.) under the trade designation ACRONAL A 220. The PSA precursor was reported to be an aqueous acrylate copolymer emulsion. The PSA precursor was coated onto a first major surface of a sheet of the filter media by rotary screen printing. The adhesive was applied to different sections of the sheet in different patterns to obtain sorbent-loaded patterns as described below. The coating was dried to leave behind a PSA, at a local area loading (basis weight) estimated to be in the range of 8-10 grams per square meter. It appeared that the PSA did not penetrate significantly into the interior of the nonwoven web; also, in the coated areas the PSA did not appear to form a continuous, uninterrupted film layer atop the first major surface of the nonwoven web.

Sorbent particles were obtained from Kuraray, JP, under the trade designation GWH. The sorbent particles were activated carbon with a reported mesh size rating of 32×60. The sorbent particles were manually gravity-sprinkled onto the first (adhesive-bearing) surface of the nonwoven web to excess, after which the web was inverted to remove unbonded particles therefrom.

A cover layer was obtained from Cerex Advanced Fabrics, Inc. (Pensacola, Fla.) under the trade designation CEREX. The cover layer was a spunbonded nonwoven web with a reported basis weight of 10 grams per square meter. The cover layer covered the entirety of the first surface of the filter media and was attached to the first surface of the filter media sheet using a hot-melt adhesive.

The nonwoven filter media sheet had the adhesive coated on the major surface thereof, in three sections each bearing a different pattern of adhesive so as to provide a different pattern of sorbent. In a first section (the middle third of the sheet shown in FIG. 8), the PSA was coated so that the section was sorbent-loaded over its entirety except for a plurality of sorbent-free areas interspersed throughout the sorbent-loaded section in a regular array. Each sorbent-free area was in the shape of a 3M corporate logo of the 3M Company. The sorbent-loaded section was generally black in appearance with generally white sorbent-free areas interspersed therein. In a second section (the upper third of the sheet shown in FIG. 8), the PSA was coated so that the section was sorbent-loaded over its entirety except for a plurality of sorbent-free areas interspersed throughout the sorbent-loaded section in a regular array. The second section was thus similar to the first section except that each sorbent-free area was in the shape of a white rectangle, with a small sorbent-loaded (thus black) 3M corporate logo of the 3M Company superimposed in the interior of the white rectangle. In a third section (the lower third of the sheet shown in FIG. 8) the PSA was coated over the entirety of the section. The third section was thus sorbent-loaded over its entirety without having any sorbent-free areas interspersed therein.

The sorbent was manually deposited on the adhesive-bearing major surface of the sheet at an area loading estimated to be approximately 130 grams per square meter. The third section comprised this sorbent loading over its entirety. The first and second sections of the sheet comprised sorbent-free areas that were of such size and number that the sorbent was present (at this local loading of approximately 130 grams per square meter) over approximately 70-80% of the area of each section.

Dust Exposure Testing

Figure 8:
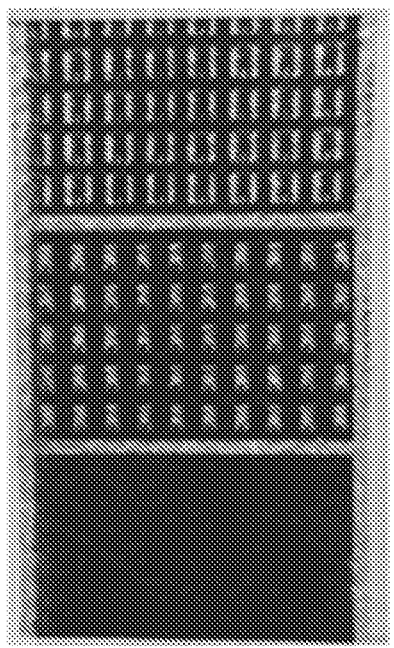
FIG. 8 is a front-view photograph of a Working Example air filter before use.
Figure 9:
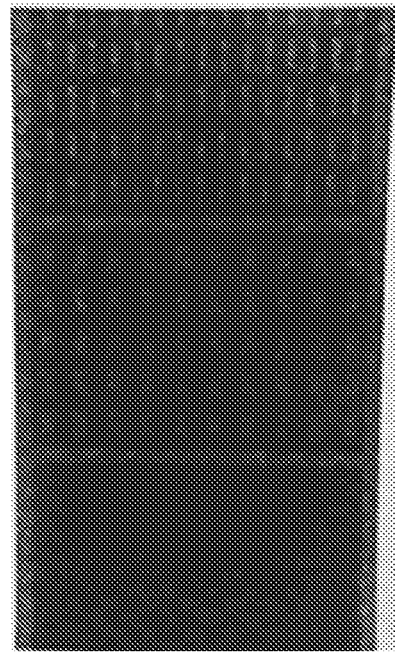
FIG. 9 is a front-view photograph of the air filter of FIG. 8, after a period of use in filtering airborne particles.
Figure 10:
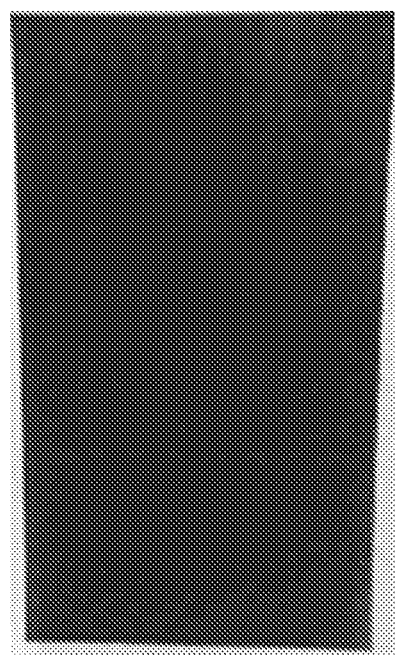
FIG. 10 is a front-view photograph of the air filter of FIG. 8, after a further period of use in filtering airborne particles.
Figure 11:
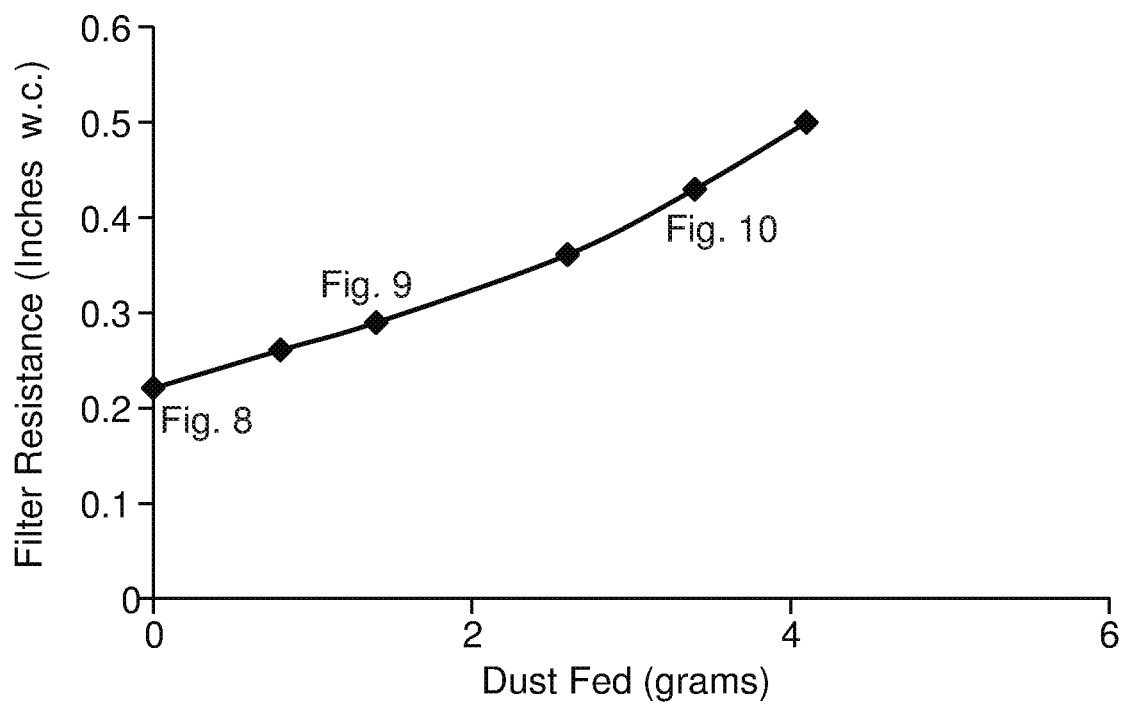
FIG. 11 is a graph of Airflow Resistance versus Dust Fed, for the Working Example air filter of FIGS. 8-10.

The sample sheet was subjected to a Dust Exposure test as described in the Test Methods section. A photograph was taken of the first side of the sheet before the test began. This photograph is presented in FIG. 8. During the test, the test was periodically stopped and a photograph taken of the sheet. Two such photographs are presented in FIGS. 9 and 10. The test was run until the pressure drop through the sample sheet reached 0.5 inches of water. The test results (pressure drop versus amount of dust fed) are presented in FIG. 11. (The test results reflect the aggregate performance of the first, second and third sections of the sheet.) Dust fed vs. pressure drop data points corresponding to FIGS. 8, 9, and 10 are identified in FIG. 11. It will be appreciated from FIGS. 8-11 that as the test proceeded and the dust loading increased, the visual appearance of the (initially white) sorbent-free areas approached the much darker visual appearance of the sorbent-loaded areas.

Toluene Removal Efficiency

The toluene removal efficiency of various filter media samples was also evaluated. It was found that Comparative Example samples that were sorbent-loaded over their entire area (with no sorbent-free areas being present) at a loading in the range of 90-130 grams of sorbent per square meter of filter media, typically exhibited a toluene removal efficiency in the range of 32-38%. Working Example Samples were made with sorbent-loaded area/sorbent-free area ratios of 75/25, 50/50, 25/75, and 17/83. (For these samples, the sorbent-free areas contained approximately 0 grams of sorbent per square meter, and the sorbent-loaded areas were believe to contain a similar loading of sorbent as noted above for samples that were loaded with sorbent over their entire area.) It was found that the toluene removal efficiencies of these samples generally scaled according to the percentage of the filter media area that was loaded with sorbent. For example, Working Example samples with a 50/50 sorbent-loaded area/sorbent free area ratio exhibited a toluene removal efficiency that was typically in the range of 50-60% of the toluene removal efficiency exhibited by the fully sorbent-loaded Comparative Examples; Working Example samples with a 75/25 sorbent-loaded area/sorbent free area ratio exhibited a toluene removal efficiency that was typically in the range of 70-80% of the toluene removal efficiency exhibited by the fully sorbent-loaded Comparative Examples.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. An air filter comprising an air filter media that comprises a visual filter life indicator zone and a visual reference zone, the air filter media comprising:
   a nonwoven fibrous filtration web comprising at least some fibers that comprise charged electret moities, wherein the nonwoven fibrous filtration web comprises a first major surface with an active particle-filtration area that includes at least one sorbent-free area and at least one sorbent-loaded area,
   wherein the at least one sorbent-free area is configured to provide a visual filter life indicator zone of the air filter, and
   wherein the at least one sorbent-loaded area is configured to provide a visual reference zone for the visual filter life indicator zone.

2. The air filter of claim 1 wherein in the sorbent-loaded area, sorbent particles are adhesively bonded to fiber portions that provide the first major surface of the nonwoven fibrous filtration web.

3. The air filter of claim 1 wherein the at least one sorbent-loaded area occupies at least about 50 percent of the active particle-filtration area of the first major surface of the nonwoven fibrous filtration web, and wherein the at least one sorbent-free area occupies at most about 50 percent of the active particle-filtration area of the first major surface of the nonwoven fibrous filtration web.

4. The air filter of claim 1 wherein the at least one sorbent-loaded area occupies at least about 70 percent of the active particle-filtration area of the first major surface of the nonwoven fibrous filtration web, and wherein the at least one sorbent-free area occupies at most about 30 percent of the active particle-filtration area of the first major surface of the nonwoven fibrous filtration web.

5. The air filter of claim 1 wherein in the at least one sorbent-loaded area, sorbent particles are present on the first major surface of the nonwoven fibrous filtration web at a loading of at least about 60 grams per square meter, and wherein in the at least one sorbent-free area, sorbent particles are present on the first major surface of the nonwoven fibrous filtration web at a loading of at most about 5 grams per square meter.

6. The air filter of claim 1 wherein in the at least one sorbent-loaded area, sorbent particles are present on the first major surface of the nonwoven fibrous filtration web at a loading of at least about 80 grams per square meter, and wherein in the at least one sorbent-free area, sorbent particles are present on the first major surface of the nonwoven fibrous filtration web at a loading of at most about 1 gram per square meter.

7. The air filter of claim 1 wherein the sorbent-loaded area comprises primary sorbent particles that are mixed with one or more types of secondary sorbent particles.

8. The air filter of claim 1 wherein in the at least one sorbent-loaded area, sorbent particles are present that comprise at least some of activated carbon particles.

9. The air filter of claim 8 wherein the activated carbon particles exhibit a mesh size that is from about 20 mesh to about 100 mesh.

10. The air filter of claim 1 wherein the at least one sorbent-free area is provided in the form of a plurality of discrete sorbent-free areas.

11. The air filter of claim 1 wherein the at least one sorbent-loaded area is provided in the form of a plurality of discrete sorbent-loaded areas.

12. The air filter of claim 1 wherein the nonwoven fibrous filtration web exhibits a particle Filtration Efficiency of at least about 50%.

13. The air filter of claim 1 wherein the at least one sorbent-free area of the nonwoven fibrous filtration web comprises at least one region that is a passivated region that is configured to provide a visual baseline zone of the air filter.

14. The air filter of claim 1 wherein the air filter is a high bypass ratio air filter comprising a conformable, unframed air filter media that is configured to be installed on a portion of an upstream face of a filter-support layer of an air-handling system, in a high bypass ratio configuration in which the air filter media occupies less than 85% of a nominal air-transmissive area of the filter-support layer.

15. The air filter of claim 1 wherein the air filter media is conformable into an arcuate shape so that the filter media can be installed on an upstream face of an arcuate filter-support layer of an air-handling system.

16. The air filter of claim 1 wherein the filter media is pleated and wherein a perimeter support frame is mounted to a perimeter of the filter media.

17. The air filter of claim 1 wherein the filter media is unpleated.

18. The air filter of claim 1 further comprising a nonwoven fibrous cover web that is affixed to the nonwoven fibrous filtration web so that sorbent particles of the at least one sorbent-loaded area of the first major surface of the nonwoven fibrous filtration web are present as a layer that is sandwiched between the first major surface of the nonwoven fibrous filtration web, and a major surface of the cover web, wherein the cover web exhibits an area density of less than about 20 grams per square meter and a thickness of less than about 1 mm and is at least substantially impenetrable by the sorbent particles.

19. The air filter of claim 1 wherein at least some fibers of the nonwoven fibrous filtration web are comprised of melt-processable polymeric resin that includes a white pigment.

20. A method of installing, visually monitoring, and replacing an air filter, the method comprising:
   a) installing the air filter of claim 1 in an air-handling system;
   b) periodically visually inspecting the air filter so as to ascertain how closely a visual appearance of the at least one sorbent-free area approaches a visual appearance of the at least one sorbent-loaded area;
   optionally repeating step b) one or more additional times; and,
   c) when the visual appearance of the at least one sorbent-free area is observed to approach the visual appearance of the at least one sorbent-loaded area so that a CIE2000 L*a*b* color space L* axis $\Delta E$ of the at least one sorbent-free area relative to the at least one sorbent-loaded area is less than 30, removing the air filter from the air-handling system.

* * * * *

UNITED STATES PATENT AND TRADEMARK OFFICE
CERTIFICATE OF CORRECTION

| | | |
|---|---|---|
| PATENT NO. | : 11,027,231 B2 | Page 1 of 1 |
| APPLICATION NO. | : 16/348254 | |
| DATED | : June 8, 2021 | |
| INVENTOR(S) | : Cheng et al. | |

It is certified that error appears in the above-identified patent and that said Letters Patent is hereby corrected as shown below:

In the Specification

Column 1
Line 14, delete "moities" and insert -- moieties --, therefor.

Column 3
Line 21, delete "moities." and insert -- moieties. --, therefor.

Column 11
Line 35, delete "moities)" and insert -- moieties) --, therefor.

Column 15
Line 32, delete "moities," and insert -- moieties, --, therefor.

In the Claims

Column 20
Line 28, in Claim 1, delete "moities," and insert -- moieties, --, therefor.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*